US009686229B2

(12) United States Patent
Thaler, III (10) Patent No.: US 9,686,229 B2
(45) Date of Patent: *Jun. 20, 2017

(54) IDENTIFYING AN EFFICIENT DESTINATION SERVER

(71) Applicant: Microsoft Technology Licensing, LLC, Redmond, WA (US)

(72) Inventor: David Garfield Thaler, III, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/076,981

(22) Filed: Nov. 11, 2013

(65) Prior Publication Data

US 2014/0075050 A1    Mar. 13, 2014

Related U.S. Application Data (63) Continuation of application No. 12/970,043, filed on Dec. 16, 2010, now Pat. No. 8,583,824.

(51) Int. Cl.
*G06F 15/173* (2006.01)
*H04L 29/12* (2006.01)
*H04L 12/26* (2006.01)

(52) U.S. Cl.
CPC ...... *H04L 61/1582* (2013.01); *H04L 43/0864* (2013.01); *H04L 61/1511* (2013.01); *H04L 61/35* (2013.01); *H04L 61/609* (2013.01)

(58) Field of Classification Search
USPC ................. 709/238, 241, 224, 203
See application file for complete search history.

(56) References Cited

U.S. PATENT DOCUMENTS

| 7,454,500 | B1* | 11/2008 | Hsu et al. ................. 709/203 |
| 8,583,824 | B2* | 11/2013 | Thaler, III ................ 709/241 |
| 2008/0155061 | A1* | 6/2008 | Afergan ............ H04L 29/08576 709/218 |

FOREIGN PATENT DOCUMENTS

| CN | 101499914 A | 8/2009 |
| CN | 101904135 A | 12/2010 |

OTHER PUBLICATIONS

"First Office Action and Search Report Received for Chinese Patent Application No. 201110423096.9", Mailed Date: Nov. 13, 2013, 10 Pages.

(Continued)

*Primary Examiner* — Philip B Tran
(74) *Attorney, Agent, or Firm* — Lee & Hayes, PLLC (57) ABSTRACT

One or more techniques and/or systems are disclosed for identifying a list of destination servers ordered by round-trip time (RTT) for a requesting machine. When a client interacts with an address, such as an IP address, when accessing a remote service, an RTT is collected for the address, or the RTT may be derived for a range of addresses, and saved in a database. When the client subsequently requests access to a remote service, a list of destination servers are returned, respectively identified by corresponding addresses. The destination servers can be sorted in order of efficiency by determining an expected RTT associated with a matching address, or range, in the database, and sorting the destination servers by their respective expected RTTs.

20 Claims, 7 Drawing Sheets

(56) References Cited

OTHER PUBLICATIONS

"Second Office Action Received for Chinese patent Application No. 201110423096.9", Mailed Date: Jul. 23, 2014, 7 Pages.
"Third Office Action and Search Report Received for Chinese Patent Application No. 201110423096.9", Mailed Date: Feb. 17, 2015, 11 Pages.
"Fourth Office Action Received for Chinese Patent Application No. 201110423096.9", Mailed Date: Sep. 6, 2015, 8 Pages.

* cited by examiner

IDENTIFYING AN EFFICIENT DESTINATION SERVER

RELATED APPLICATION

This application is a continuation of U.S. application Ser. No. 12/970,043, filed on Dec. 16, 2010, entitled "IDENTIFYING AN EFFICIENT DESTINATION SERVER", at least some of which may be incorporated herein.

BACKGROUND

Multiple remote servers can be addressed by a requesting client using a common name. For example, the client may wish to navigate to www.exampledomain.com. In this example, remote access to www.exampledomain.com may be provided by a plurality of servers (or server farms). Often, providers of a remote service may locate remote destination servers for the service in geographically disparate locations (e.g., London, New York and Los Angeles), in order to provide better service to many users. For example, a user in England may wish to connect to a destination server in London rather than New York, as the London connection will typically provide for a more efficient connection (e.g., faster service), thereby providing a better user experience.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

When a client has a set of Internet Protocol (IP) addresses of destination servers to choose from (e.g., DNS servers, web servers returned by DNS queries, etc.), it may be desirable for the client to sort them in a desired manner, such as one that can place a most performant (e.g., fastest connection) one first. Destination servers can be geographically disparate (e.g., in different states, countries or continents), and a destination server that is closer to the client usually provides for a faster connection. When the IP addresses returned from the request for sorting are geographically disparate, sorting should take locality into account. However, current techniques and systems do not account for situations when the destinations are geographically distant, which may lead to lessened user experience.

Accordingly, one or more techniques and/or systems are disclosed that provide for selecting a destination server, which may have a faster connection, without making changes to servers. Further, where previous techniques and/or systems typically utilize (bandwidth consuming) active probing and/or additional server-related data to make decisions on selection, the techniques and/or systems disclosed can merely utilize existing server related information (e.g., IP addresses and round trip times) to identify an efficient destination server, thus likely consuming less bandwidth and/or other overhead.

In one embodiment for identifying a list of destination servers ordered by round-trip time (RTT) for a requesting client machine, RTTs are collected or derived from a database of historical interactions between the requesting client and addresses (e.g., IP addresses) corresponding to destination servers that have satisfied prior requests from the client. The collected or derived RTTs may correspond to an address of a destination server that may be accessed to satisfy a current request from the client and/or from a range of addresses corresponding to destination servers. Accordingly, a list of addresses and/or corresponding destination servers that correspond to the collected or derived expected RTTs can be sorted according to expected RTTs such that a destination server that may yield a desired (e.g., shortest) response time for the current request may be placed at the top of the list, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can identify a destination server to efficiently satisfy a request from client. Historical round trip times (RTTs) for data sent between the client and Internet Protocol (IP) addresses can be saved, or used to derive an aggregated RTT state for a range of IP addresses. IP addresses of destination servers returned from a current request can be compared against the saved historical data to identify expected RTTs for the destination servers. The list of destination servers can thus be sorted according to the expected RTTs for the current request to identify a desirable (e.g., most efficient) destination server to satisfy the request, for example.

Figure 1:
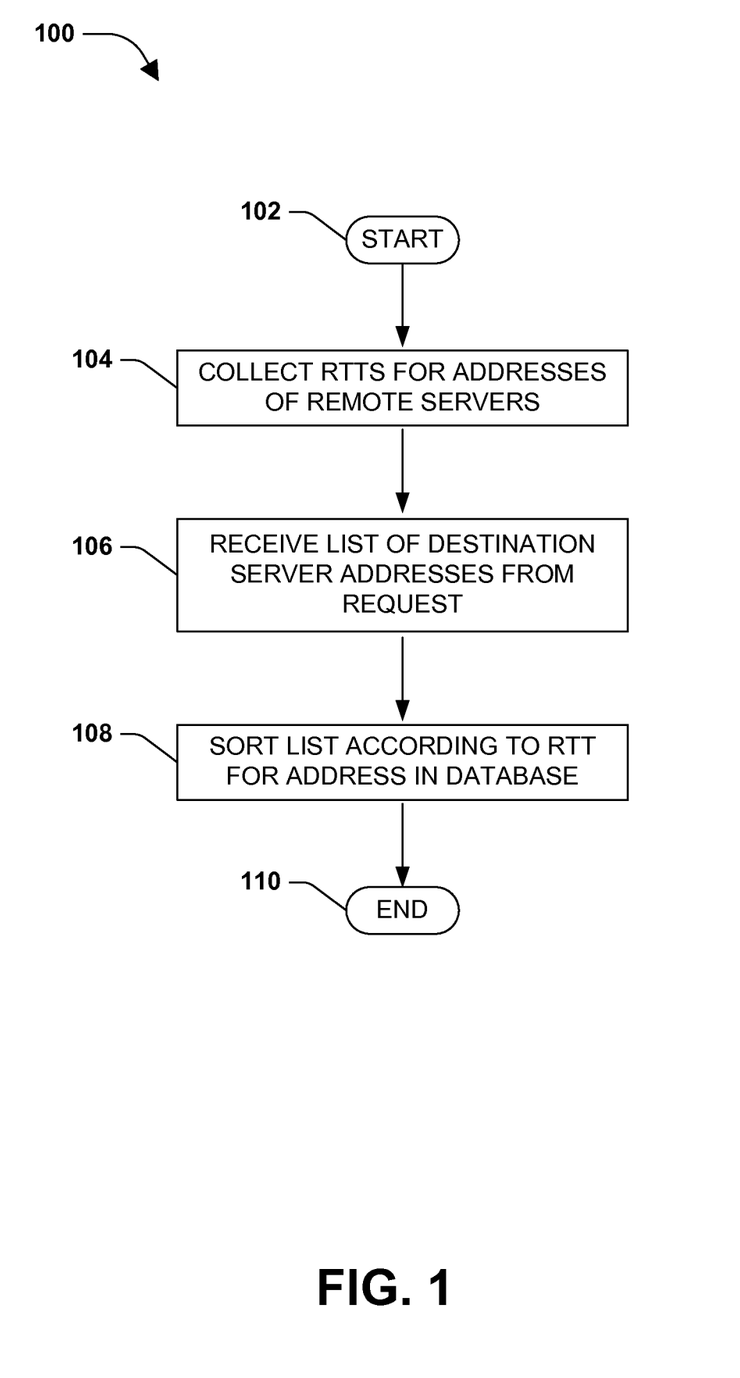
FIG. 1 is a flow diagram of an exemplary method for identifying a list of destination servers ordered by (expected) round-trip time from a requesting machine.

FIG. 1 is a flow diagram of an exemplary method 100 for identifying a list of destination servers ordered by round-trip time (RTT) for a requesting client machine. The exemplary method 100 begins at 102 and involves collecting RTTs for addresses, such as Internet Protocol (IP) addresses, IP addresses plus associated ports, and/or IP addresses plus associated protocols (e.g., TCP, UDP), etc., (e.g., where "plus" does not imply an arithmetic operation) of remote servers with which a client has interacted, at 104. For example, over time the client may interact with a plurality of remote servers that provide access to Internet sites, remote services, network connections, and/or peer-to-peer connections, etc. In this example, during the interactions with the remote servers, the RTT for a data packet transfer can be identified and associated with a corresponding address. In this way, in one embodiment, the address and corresponding RTT can be saved, such as in a database (e.g., comprising a table of IP addresses and corresponding RTTs satisfying prior requests from the client).

In another embodiment, the RTT may be derived for a range of addresses. For example, IP addresses may be saved in a database that comprises one or more ranges of IP addresses. In this example, when an RTT is obtained for an IP address in the range, it may be used to determine a common RTT for the range, such as an average, median, best, least, and/or some other statistical derivation that meets a desired RTT characteristic. For example, a slowest RTT may be assigned for the range of IP addresses, such as to provide for a worst case scenario when determining which destination server to use in a subsequent communication.

At 106 in the exemplary method 100, a list of destination server addresses can be received in response to a current request from the client. For example, when a client attempts to navigate to a website there may be more than one remote server configured to service or otherwise provide access to that website. Websites and other remote services typically provide a plurality of server locations in an attempt to provide a better user experience for users in many locations. For example, a user in Ohio connecting to a website's server in New York may have a different user experience than if they connected to the website's server in London. Further, a user in Ireland would have a different user experience when connecting to the website's server in London than when connecting to the website's server in New York. Providing disparate servers (e.g., or server farms) that service disparate users can provide an improved user experience (e.g., faster connection speed, faster uploads and downloads), for example.

When a user attempts to navigate to the remote service, a plurality of destination server addresses can be returned in response to the request (e.g., servers that can service the client request for access to the remote service). In one embodiment, the requesting client can choose one of the IP addresses, from the list of destination servers, with which to connect to the remote service. However, without knowing which address may provide a desired (e.g., most efficient) connection (e.g., fastest data transfer speed), for example, the requesting client may connect to a less efficient destination server, thus possibly resulting in a less desirable user experience.

At 108 in the exemplary method 100, the list of destination servers returned from the current request is sorted according to RTTs (e.g., expected RTTs), which are identified from a database comprising RTTs for addresses (e.g., ranges of IP addresses, IP addresses plus associated ports, and/or IP addresses plus associated protocols, etc.) that previously satisfied one or more requests from the client, for example, and/or were derived from RTTs for a range of IP addresses. Here, the respective RTTs in the database may be collected from historical interactions between the client and the addresses (or an IP address in a range of IP addresses) in the database. That is, the current request can return a list of addresses for destination servers that may satisfy the current request, and a database can comprise historical RTTs (e.g., or derived RTTs) for addresses, where the corresponding destination servers (to the addresses in the database) may have satisfied prior requests from the client, and/or have an address that falls within or otherwise corresponds to a range of addresses in the database. As described above, the destination servers may be located in different geographic locations, and, based on the location and connection, may provide for different user experiences.

In this example, the addresses for the destination servers that can satisfy the current request can be compared against addresses in the database of saved information. For example, the RTTs associated with the addresses in the database can be used to sort the returned addresses for the destination servers that may satisfy the current request; and, in this example, a first or topmost destination server in the sorted list can comprise a most efficient (e.g., fastest, shortest) RTT. In this way, for example, the client can select the most efficient destination server to satisfy the request for the remote service, and may have a better user experience than if the server was selected randomly, or in a revolving pattern for clients, for example.

Having sorted the list of addresses for the destination servers, the exemplary method 100 ends at 110.

Figure 2:
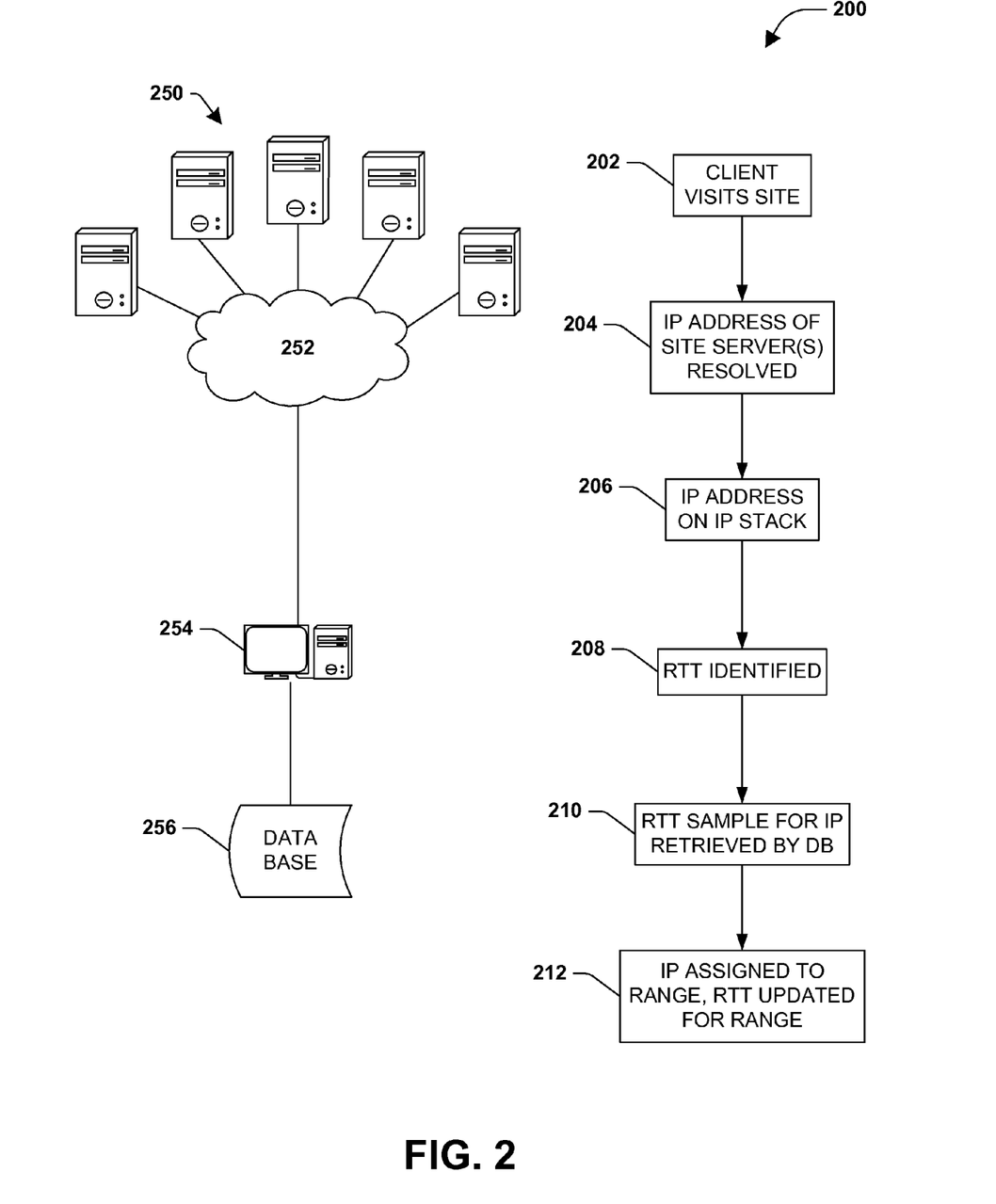
FIG. 2 is a flow diagram, and accompanying illustrative example, illustrating one embodiment of one or more portions of a method described herein.

FIG. 2 is a flow diagram, and accompanying illustrative example, illustrating one embodiment 200 of one or more portions of a method described herein. At 202, a client 254 navigates to a site, such as a remote service, website, or some other online access point. Commonly, a user can navigate to a site by inputting a site name or address into a browser navigation field, for example. As another example, an application may attempt to access a site programmatically by sending a request to resolve a name of the site or service.

In this illustrative example, the client may visit a plurality of sites, respectively served by one or more destination servers 250. Further, the destination servers may be connected to the Internet 252 (e.g., or some other network) to which the client 254 can connect to access the site or service. At 204, an IP address of one or more of the site servers 250 can be resolved. For example, a domain name system (DNS) may be utilized to resolve a site name to one or more IP addresses of destination servers for the site. In this example, a local DNS (LDNS) server can be contacted by the client 254 over the Internet 252, and the LDNS can contact an authoritative DNS (ADNS) server for the name of the site. Further, the ADNS can resolve one or more IP addresses for destination servers serving the site, and return them to the LDNS, which returns them to the client, for example.

At 206, in one embodiment, when the client 254 interacts with a destination server using a returned IP address, an IP stack at the client can manage the connection information. It may be appreciated that where one or more addresses are returned, the addresses may be sorted (e.g., based on any prior information), and a desired address may be chosen based on the sort.

Further, in one embodiment, upon interaction with the IP address by the requesting client 254, a round trip time (RTT) can be determined, at 208. For example, when a data packet is sent to the IP address from the client, a time that it takes for the server to respond can be identified, and collected by the IP stack. As an illustrative example, the RTTs for IP addresses in connection with the client machine are typically maintained by a TCP/IP stack, at least for a duration of the connection, and/or session.

In one embodiment, a database 256 of IP addresses can be maintained, along with associated RTTs for the IP addresses. The database 256 can be populated with an RTT that corresponds to an IP address upon interaction with the IP address by the requesting client 254. At 210, the RTT sample, such as collected by the IP stack, can be retrieved for saving in the database 256, and assigned to the IP address (e.g., for a responding server 250) with which the client is interacting.

In one embodiment, maintaining the database 256 of IP addresses associated with RTTs can comprise maintaining a database comprising one or more ranges of IP addresses, where the respective one or more ranges are respectively associated with an RTT. In this embodiment, at 212, an RTT can be associated with (e.g., assigned to) a range of IP addresses upon interaction with an IP address in the range by the requesting machine, as described in further detail below. In this embodiment, one or more ranges of IP addresses can be maintained in the database, for example, and the RTT can be assigned to the range that comprises the IP address associated with the RTT sample from the IP stack.

In this way, for example, the database may be managed in a more efficient manner, where ranges of IP addresses are associated with an RTT instead of separately saving one RTT for one IP address. Further, in one embodiment, the ranges of IP addresses can be updated, such as when a new IP address interaction is undertaken by the client and/or a new RTT for the range is identified. In this example, the database can be dynamic (e.g., changing on-the-fly, or in real-time) based on client interactions; and can thus be an efficient in use of storage. Additionally, the database may be stored locally, such as by the client, and/or at least portions of it may be stored remotely, such as in a cloud-based data management system.

In one embodiment, a range of IP addresses maintained by the database can be associated with a continent-level assignment of IP addresses. For example, the Internet Assigned Numbers Authority (IANA) provides for global IP address allocation, as well as other IP related system assignments. IANA allocates blocks of IP addresses to several regional Internet registries (RIRs), comprising the African Network Information Centre (AfriNIC), American Registry for Internet Number (ARIN), the Asia-Pacific Network Information Centre (APNIC), the Latin America and Caribbean Network Information Centre (LACNIC) and the Réseaux IP Européens Network Coordination Centre (RIPE NCC). These RIRs typically follow regional policies to provide IP addresses to customers, including Internet service providers (ISPs) and end-user organizations, such as corporations. In this embodiment, the block of IP addresses assigned to respective RIRs may be maintained in the database, for example, to facilitate an identification of a general location of a destination server (e.g., continent-based).

In one aspect, an abstract data model may be provided for maintaining (e.g., storing, providing, managing, updating) the IP addresses and associated RTTs. In one embodiment, a "global network list" may comprise several entries (e.g., columns), such as: "NetworkID" comprising a local (e.g., local to a host) identifier of a network to which the host is, or was previously, attached; "LastVisited" comprising a timestamp of a last time the host was attached to that network; "RttTable" comprising a table associated with the NetworkID, which may comprise the following entries (e.g., columns): "StartAddress" comprising a first IP address in a row's range; "EndAddress" comprising a last IP address in the row's range; "MinRTT" comprising an expected minimum RTT (e.g., in milliseconds) to addresses in the row's range; and "LastUpdated" comprising a timestamp of last MinRTT update.

Further, in one embodiment, the abstract model can comprise a Global Continent Table, which may comprise the following entries (e.g., columns): an IP address prefix; an IP address prefix length; and a "ContinentID", such as for ARIN, RIPE, APNIC, LACNIC, or AFRINIC. In this embodiment, for example, the database can comprise the respective IP address ranges for the respective continent-level areas. Other embodiments are contemplated as well, such as tables with country, state and/or other geographic granularities, etc., for example.

In one aspect, the RTT samples are received and populated to the database. In one embodiment, in this aspect, an algorithm may be used to receive the RTT samples, such as "MinRTT" samples for IP address ranges. For example, an algorithm code can poll the TCP database periodically, such as by having TCP call an internal "sample available" function when an RTT sample is available. As another example, an application programming interface (API) may be used for RTT sample polling for other protocols, such as DNS. As an additional example, a non-polling scheme may be use, such as where the Transmission Control Protocol (TCP) provides an RTT sample when a new one becomes available (e.g., on reception of a response).

In one embodiment, in this aspect, when an RTT sample comes in for remote IP address R and local IP address L, the following acts may be performed. The local IP address L (e.g., being assigned to the local host's connection to a specific network) can be used to determine which RTT table to use, if there is more than one. The remote IP address R can be looked up in the RTT table to see if it falls within the range of some row. If no range is found, a new row can be started (e.g., or an existing row's range can be extended to cover the IP address), for example, and/or some date criteria may be used to create a new row (e.g., if the "LastVisited" meets some criteria).

Further, if the RTT sample meets some criteria (e.g., time related, speed related, or some threshold), the "MinRTT" can be updated to account for the RTT sample value (e.g., using a moving average). Additionally, the "LastUpdated" can be updated to a current time stamp. In this embodiment, it may be determined that two or more rows may be combined. For example, if the new IP address comprises an end address of a range, and it is adjacent (e.g., or within some range threshold) to another range end address, the two ranges may be combined. In one embodiment, when combining IP address ranges, the MinRTTs from the respective ranges are similar, for example, so that (vastly) different MinRTTs are not combined.

In order to conserve memory, for example, it may be important to not allow a number of rows in an RTT table to grow without bound. In one embodiment, a maximum number of rows (e.g., one thousand) may be used as an upper limit, and rows can be evicted from the table when needed. For example, if the table is full (e.g., meets the upper limit), an oldest existing row (e.g., least recently updated) can be evicted before creating a new row, such as by using the "LastUpdated" field in respective rows. In one embodiment, an original row may be split, such as to account for a new MinRTT sample for a remote IP address, particularly when the new MinRTT sample is significantly different from the MinRTT for the range prior to splitting (e.g., within some delta, such as 20 milliseconds, for example).

In one embodiment, when two IP local/remote address pairs are compared for sorting, the expected MinRTT can be identified from a table for respective pairs and compared with the MinRTT estimates for the pairs. As an example, a pair having a lower MinRTT estimate may be chosen. In this embodiment, when there is a tie between the pairs (e.g., where the values for the MinRTT are within some threshold range of each other and thus not necessarily exactly equal), the continentID for respective IP address can be identified from the database, and if one pair has addresses with a same continent ID, and the other pair has addresses with different continent IDs, the pair having the same continent ID can be chosen.

Figure 3:
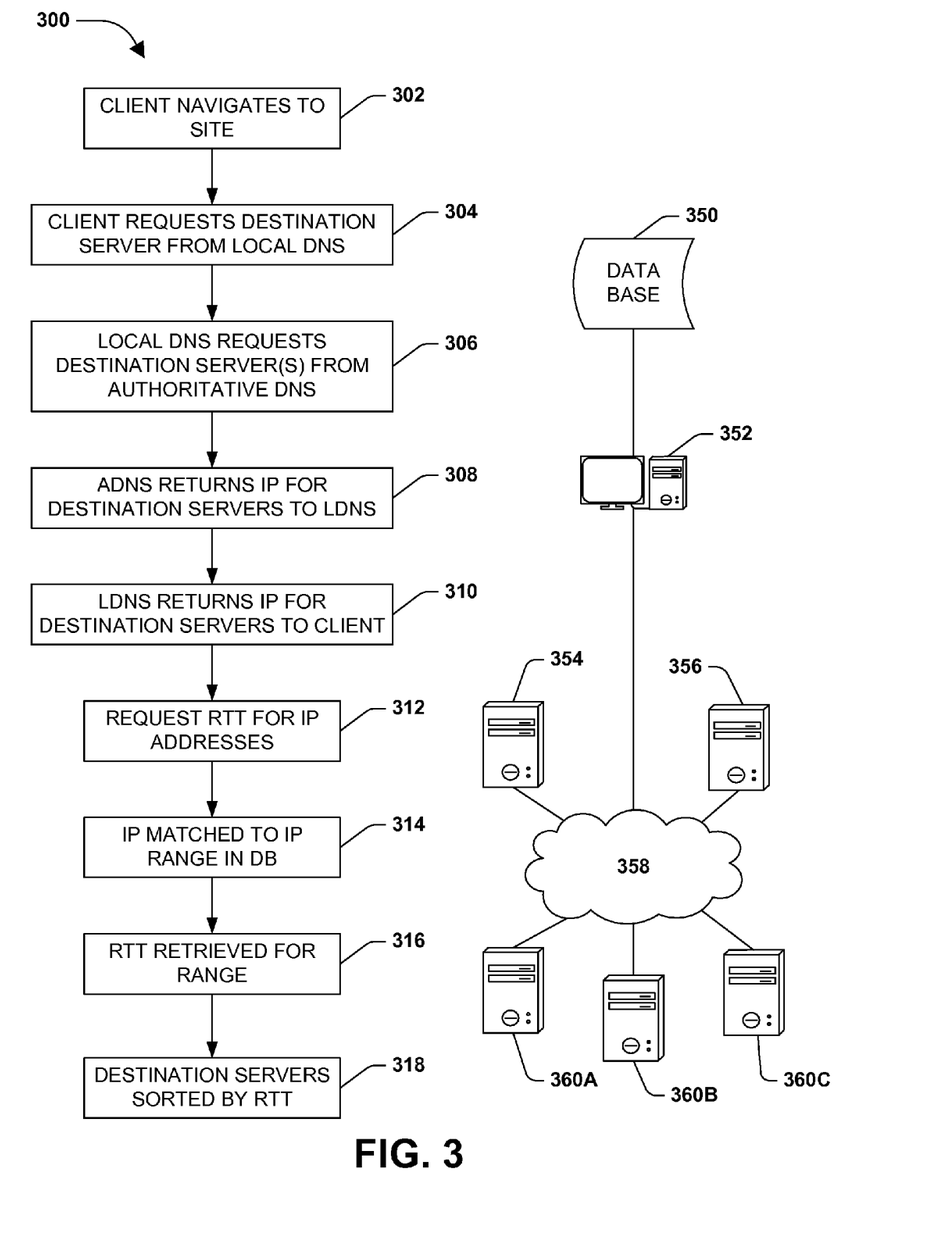
FIG. 3 is a flow diagram, and accompanying illustrative example, illustrating one embodiment of one or more portions of a method described herein.

FIG. 3 is a flow diagram, and accompanying illustrative example, illustrating one embodiment 300 of one or more portions of a method described herein. At 302, a client 352 navigates to an online site or service, such as by using the Internet 358. For example, a user may input a site address or name into a browser resident on the client 352, or an application used by the client 352 may programmatically attempt to access a remote service or site.

At 304, the client can connect to the Internet (e.g., or some online network) to request a destination server for the requested site or service from a local domain name system (LDNS) server 354. For example, clients that connect to the Internet are typically assigned a LDNS server, which is used to resolve online names to IP addresses of destination servers. The LDNS server 354 can identify an authoritative DNS (ADNS) server 356 for the site/service name. The ADNS server is used by the site to resolve IP addresses for the destination servers 360 for the site, and return them to requesting LDNS servers, for example.

At 306, the LDNS server 354 can request destination servers 360 for the request from the client from the ADNS server 356, such as over the Internet 358. At 308, the ADNS 356 can return the IP addresses of the destination servers 360 for the site, to the LDNS server 354. At 310, the LDNS server 354 can return a list of the IP addresses of the destination servers 360 that may satisfy the request to the requesting client 352.

In one embodiment, the IP addresses may not be resolved using a DNS. For example, other types of name resolution may be utilized, such as using Windows Internet Name Service (WINS) when using NetBIOS names, or Peer Name Resolution Protocol (PNRP) when using "peer names" for an Internet host of a service. As another example, some clients may utilize preconfigured destination server IP addresses when accessing a remote service. In this example, the client may be pre-configured with IP addresses of destination servers in geographically disparate locations, such as for reaching a closest server when traveling. In this embodiment, the list of IP addresses for destination servers can be provided using any appropriate protocol.

At 312, in order to sort the returned destination server IP addresses, an RTT can be requested for the respective IP addresses in the list. At 314, the IP address for the destination servers 360 can be matched to a range of IP addresses in database 350. For example, if a returned destination server IP address falls within a range of IP addresses (e.g., within a sequence, a block, a segment, etc.) in the database, the destination server IP address can be said to match the range. In another example, the IP address for a destination server can be directly found in the database 350.

In one embodiment, matching the IP address of the destination server to a range of IP addresses in the database can comprise matching the IP address to a closest range of IP addresses. For example, the destination server IP address may comprise an adjacent IP address to a range, or may fall within a threshold number of IP addresses from an end point of the range. In this example, the destination server IP address can match the range if it falls within a desired threshold outside of the range.

Further, in one embodiment, the matching of the destination server IP address to the range of IP addresses in the database can comprise matching the IP address to a continent-level range of IP addresses. For example, if the destination server IP address does not fall within a range in the database (e.g., or close enough to be within a desired threshold away), the destination server IP address can be matched with a continent-level range (e.g., block of IP addresses assigned to a RIR). In this way, for example, at least a general, regional location of the destination server may be identified.

At 316, a RTT associated with the range of IP addresses in the database 350 is retrieved for the destination server 360 that was returned for the request by the client 352. For example, the "MinRTT" value assigned to a range of IP addresses can be retrieved for the destination server IP address matched to the range. Further, MinRtt values can be retrieved from the database 350 for the respective destination server IP addresses returned for the request, for example.

At 318, the destination servers 360 returned for the request can be sorted by their respective RTT values. In one embodiment, the destination servers 360 can be sorted from a fastest RTT to a slowest RTT, for example, where the IP address having the smallest expected MinRTT value (e.g., as determined from database) can be assigned as a first destination server in the list, and the IP address having the largest expected MinRTT value can be assigned as a last destination server in the list. In this way, for example, the first destination server on the list may comprise a most efficient destination server for the client to choose to connect with, in order to access the remote service.

In one embodiment, the sorting the list of destination servers returned from a request can comprise working with a list of geographically disparate destination servers. For example, destination server 360A may reside in New York, destination server 360B may reside in Los Angeles, and destination server 360C may reside in London. In this example, if the client resides in Ohio, the destination server 360A in New York is likely to be associated with an IP address range having a faster RTT than the other two destination servers 360B, 360C. Even though the respective servers 360A, 360B and 360C can provide access to the remote service, connecting to 360A from the client in Ohio can provide for a better user experience (e.g., faster upload and download times), for example.

Figure 4:
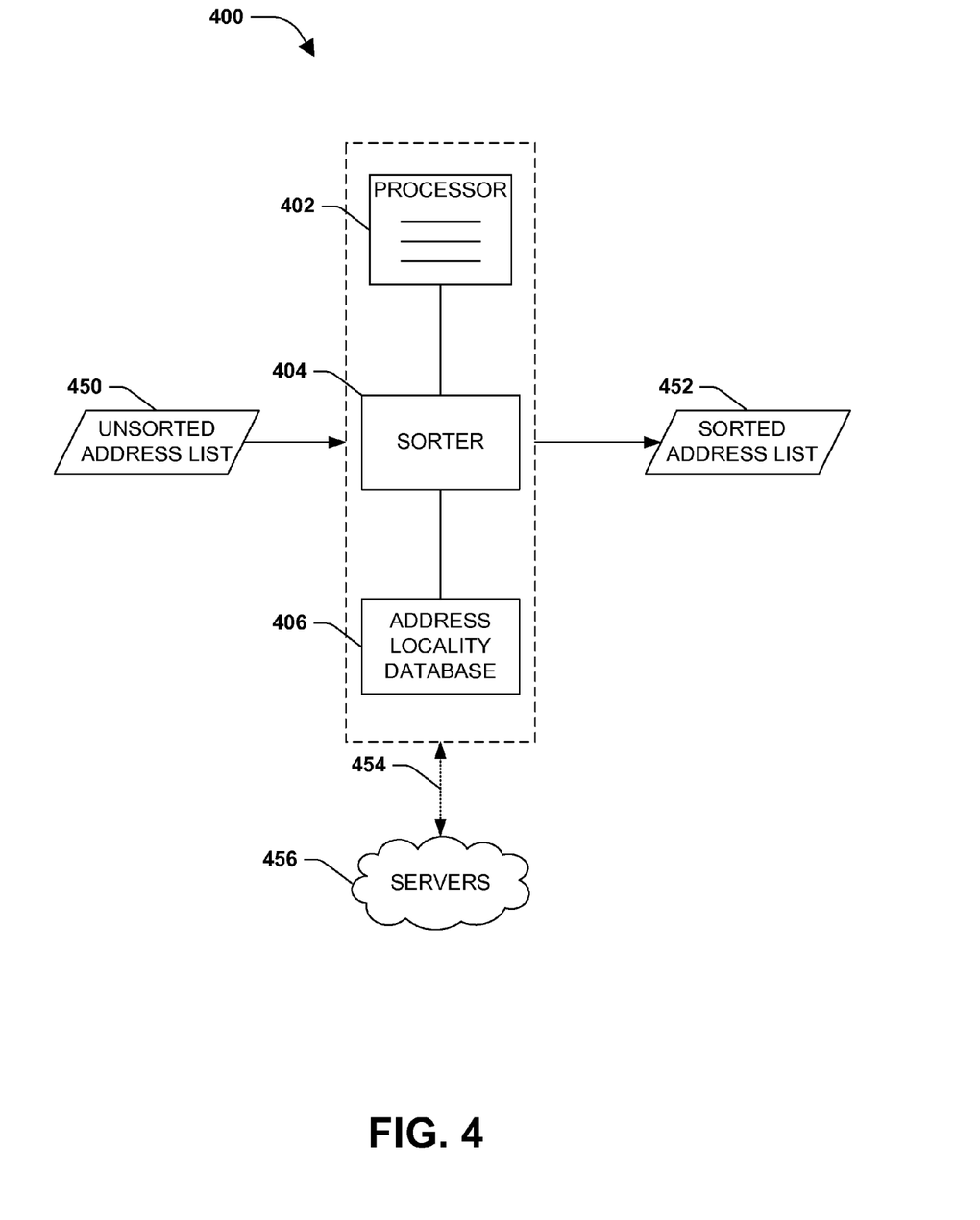
FIG. 4 is a component diagram of an exemplary system for identifying a list of destination servers ordered by (expected) round-trip time from a requesting machine.

A system may be devised and used for identifying a destination server for accessing an online site or service that has an efficient connection to an accessing client. FIG. 4 is a component diagram of an exemplary system 400 for identifying a list of destination servers ordered by round-trip time (RTT) from a requesting machine. A computer-based processor 402 is configured to process data for the system, and is operably coupled with a sorting component 404. The sorting component 404 is configured to sort a list of addresses 450 of destination servers 456 by round trip time (RTT) using addresses of the respective destination servers 456. In this way, for example, an unsorted list of Internet Protocol (IP) addresses (e.g., and/or IP addresses plus associated ports, and/or IP addresses plus associated protocols, etc.) 450, representing destination servers returned from a client request, can be arranged to a sorted list of IP addresses 452, such that a higher sorted IP address may represent a more efficient destination server for the client request.

An address locality database component 406 is operably coupled with the sorting component 404. The address locality database component 406 stores addresses (or address ranges) and corresponding RTTs, where the RTTs have been identified for the addresses by one or more interactions 454 between the client and remote servers 456 corresponding to the addresses (e.g., where the remote servers have previously satisfied requests from the client). For example, when the client interacts with 454 remote servers 456, an IP address of the remote server can be saved in the database along with an RTT for the remote server IP address. In this way, for example, when the sorting component 404 receives a list of unsorted IP addresses 450, an RTT can be retrieved for the respective IP addresses in the list, and used to sort the list.

Figure 5:
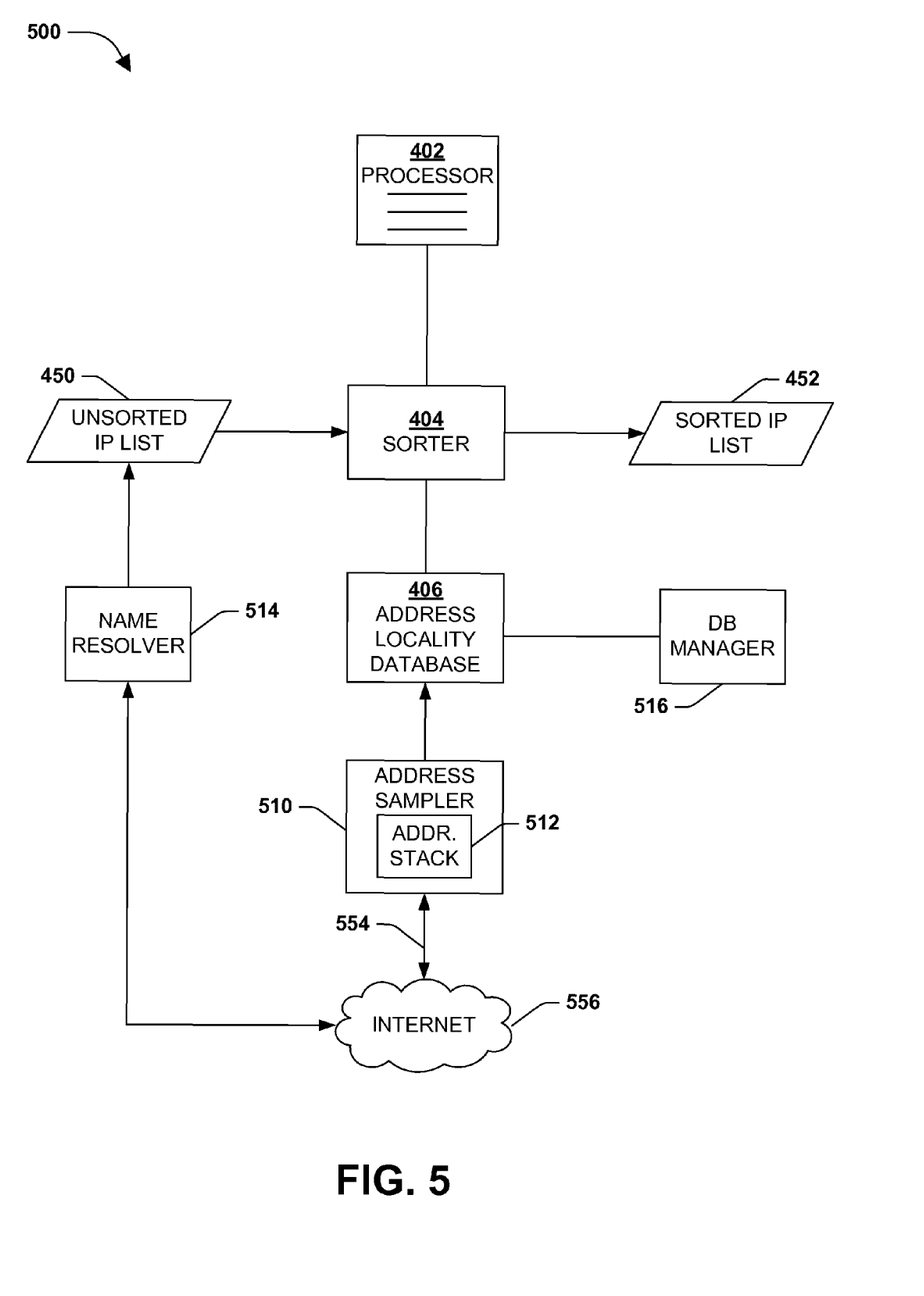
FIG. 5 is a component diagram illustrating an example embodiment where one or more systems described herein may be implemented.

FIG. 5 is a component diagram illustrating an example embodiment where one or more systems described herein may be implemented. An address sampling component 510 can provide an RTT sample to the address locality database component 406 for an address, such as an IP address, from an interaction 554 with the address, such as over the Internet 556. Further, the address sampling component 510 can comprise an address stack component 512 that collects RTTs for addresses with which a client is interacting. For example, when the client connects to a remote service over the Internet 556, the address stack component 512 can identify the RTT for the connection, or derive an RTT for a range of addresses associated with the address, and the RTT can be saved to the database 406 in association with the address (or range) for the remote service.

A name resolution component 514 may provide a list of destination servers, respectively identified by an address, to the sorting component 404, resolved from a site name. For example, when the client sends a request over the Internet 556 to access a remote service, the name resolution component 514 can retrieve a list of IP addresses that the remote service uses for its destination servers, in order to provide the remote service. These retrieved IP addresses 450 can be provided to the sorting component 404, which may utilize the address locality database 406, for example, to determine a sorted list of IP addresses 452 and thus a desired (e.g., most efficient) destination server to connect with for the remote service.

A database management component 516 can maintain the address locality database 406. Maintaining the address locality database 406 can comprise assigning an address to a corresponding range of addresses in the database 406. For example, in maintaining the database 406, instead of maintaining an RTT for respective IP addresses, an RTT can be assigned to a range of IP addresses, such as to reduce a size of the database. Further, the database management component 516 can organize the addresses by assigning particular sampled addresses to a range. Nevertheless, the database management component 516 can also merely assign respective addresses having corresponding RTTs to the database. Further, database management component 516 can assign an RTT to a corresponding range of addresses. For example, when sample RTTs are received from the address sampling component 510, they can be appropriately assigned to an IP range in the database, for example, and the range RTTs can be updated as needed.

Figure 6:
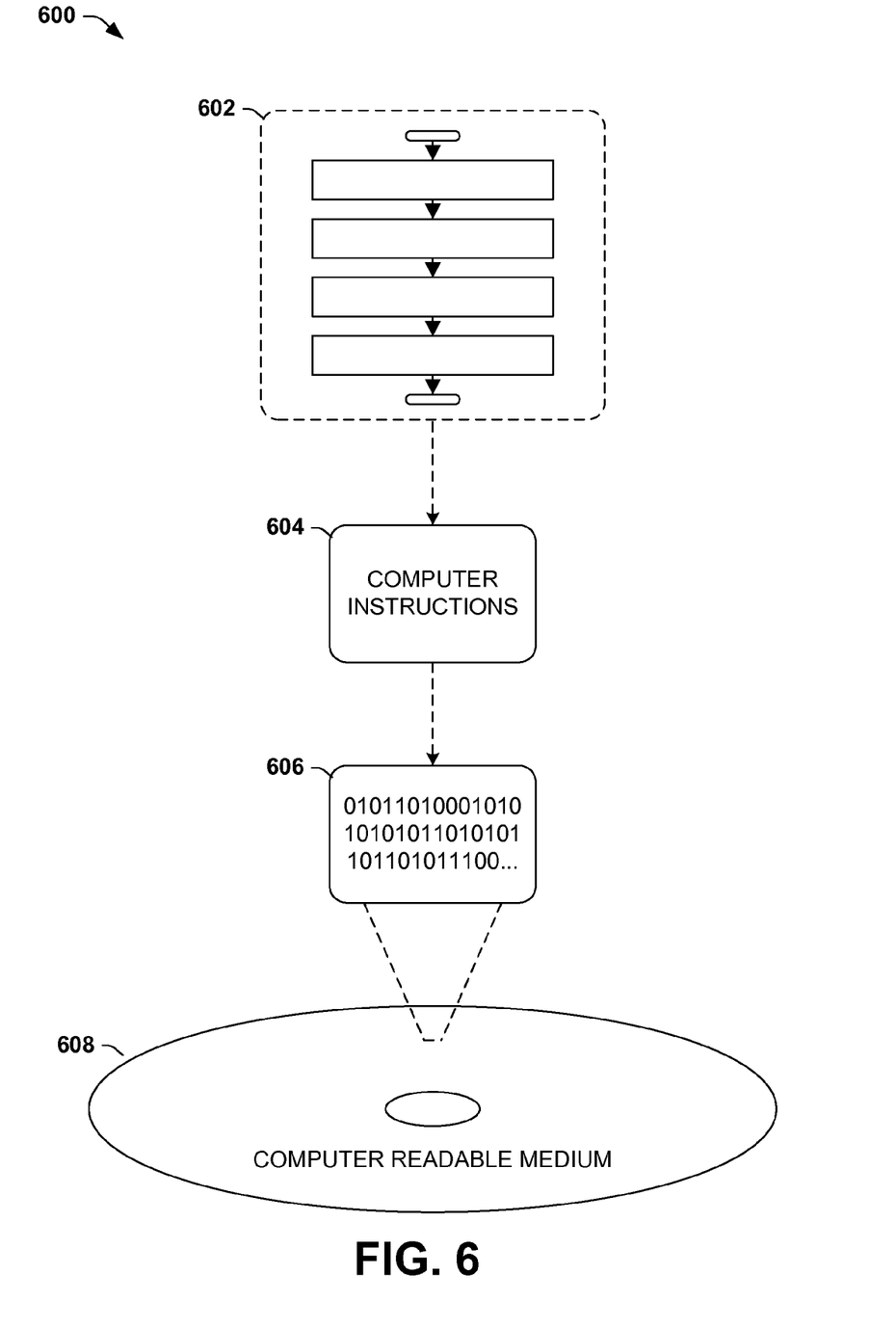
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 100 of FIG. 1, for example. In another such embodiment, the processor-executable instructions 604 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
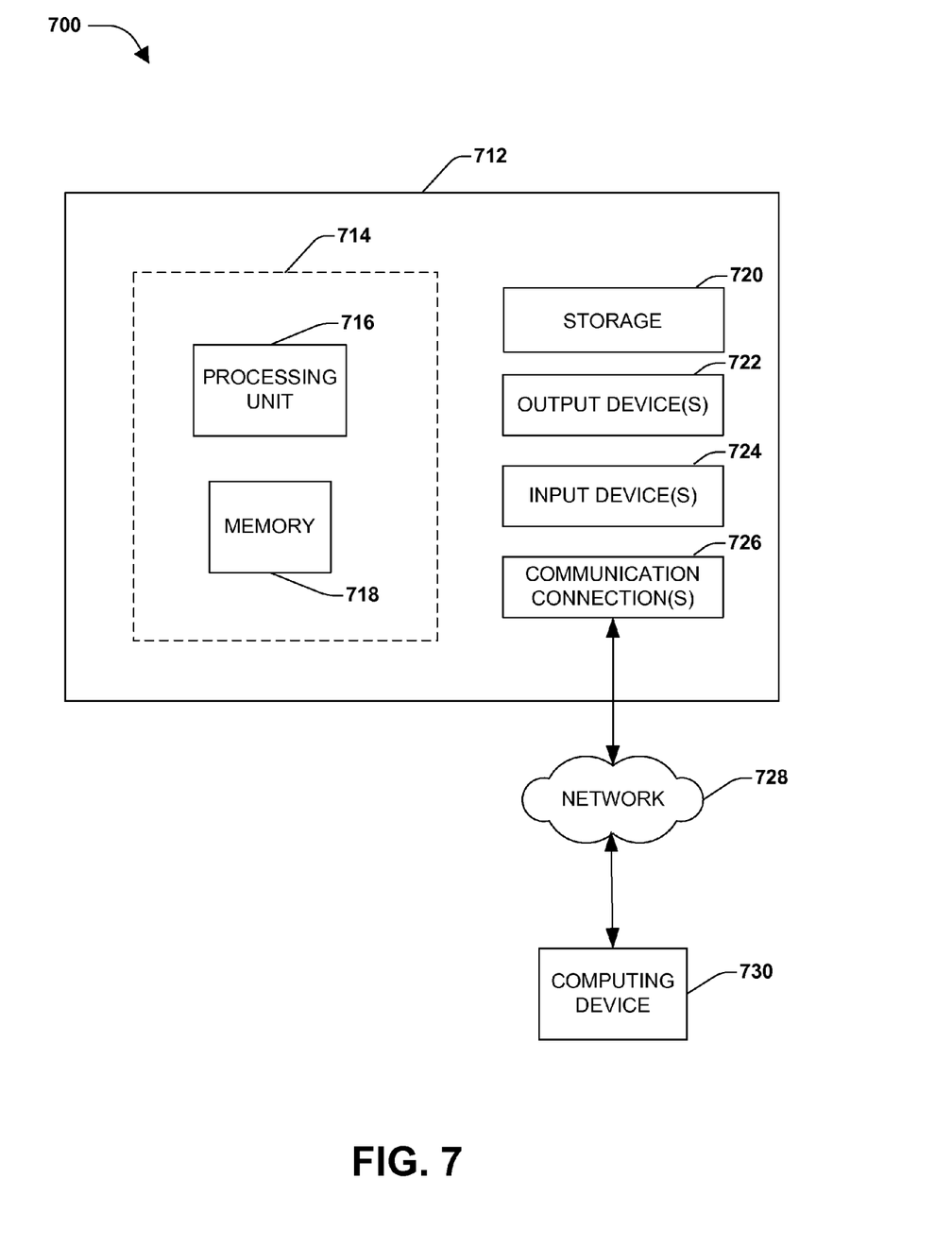
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   receiving a first address of a first server;
   receiving a second address of a second server, the first server and the second server both configured to service a same client request;
   matching the first address to a first address range, the first address range having a first associated response time;
   matching the second address to a second address range, the second address range having a second associated response time; and
   ordering the first server and the second server relative to one another based at least upon:
      the first associated response time associated with the first address range that is matched to the first address of the first server, the first associated response time based at least in part on an average of a plurality of response times for addresses in the first address range, wherein a response time of the plurality of response times is associated with a round trip response time between a client device associated with the same client request and the first server; and
      the second associated response time associated with the second address range that is matched to the second address of the second server.

2. The method of claim 1, at least one of the first address or the second address comprising at least one of:
   an Internet Protocol (IP) address;
   an IP address plus port; or
   an IP address plus protocol.

3. The method of claim 1, the first address range different than the second address range.

4. The method of claim 1, the first address and the second address associated with a common site.

5. The method of claim 1, the receiving the first address and the second address based at least upon a query for a list of one or more addresses associated with a domain name.

6. The method of claim 1, comprising receiving the first address and the second address from a domain name system server.

7. The method of claim 1, wherein the average is a first average, the plurality of response times is a first plurality of response times, the response time is a first response time, and the round trip response time is a first round trip response time, the second associated response time based at least in part on a second average of a second plurality of response times for addresses in the second address range, wherein a second response time of the second plurality of response times is associated with a second round trip response time between the client device associated with the same client request and the second server.

8. A system, comprising:
   one or more processing units; and
   memory comprising instructions that are executable by at least one of the one or more processing units to perform acts comprising:
      matching a first address of a first server to a first address range, the first address range having a first associated response time, the first associated response time associated with a slowest response time of a first plurality of response times for addresses in the first address range;
      matching a second address of a second server to a second address range, the second address range having a second associated response time, the second associated response time associated with a slowest response time of a second plurality of response times for addresses in the second address range, the first server and the second server both configured to service a same client request; and
      ordering the first server and the second server relative to one another based at least upon:
         the first associated response time associated with the first address range that is matched to the first address of the first server; and
         the second associated response time associated with the second address range that is matched to the second address of the second server.

9. The system of claim 8, at least one of the first address or the second address comprising at least one of:
   an Internet Protocol (IP) address;
   an IP address plus port; or
   an IP address plus protocol.

10. The system of claim 8, the first address range different than the second address range.

11. The system of claim 8, the first address and the second address associated with a common online service.

12. The system of claim 8, wherein the acts further comprise receiving the first address and the second address in response to a query for a list of one or more addresses associated with a domain name.

13. The system of claim 8, the acts further comprising receiving the first address and the second address from a domain name system server.

14. The system of claim 8, wherein a response time of the first plurality of response times is associated with a round trip response time between a client device associated with the same client request and the first server.

15. A computer-readable device comprising instructions that are executable to cause a computing device to:
   transmit a query for a list of servers to service a client request;
   receive, responsive to the query, a first address of a first server and a second address of a second server;
   match the first address to a first plurality of addresses;
   match the second address to a second plurality of addresses; and
   order the first address and the second address relative to one another based at least upon:
      a first historical delay time associated with the first address range that the first server is matched to, the first historical delay time associated with a slowest response time of a plurality of response times for addresses in the first address range; and a second historical delay time associated with the second address range that the second server is matched to.

16. The computer-readable device of claim 15, at least one of the first address or the second address comprising at least one of:

an Internet Protocol (IP) address;
an IP address plus port;
or an IP address plus protocol.

17. The computer-readable device of claim 15, the first address range different than the second address range.

18. The computer-readable device of claim 15, the first address and the second address associated with a common site.

19. The computer-readable device of claim 15, the list of servers to service the client request queried based at least upon a site name.

20. The computer-readable device of claim 15, the first range of addresses including a contiguous range of Internet Protocol addresses.

\* \* \* \* \*